Figure 1:
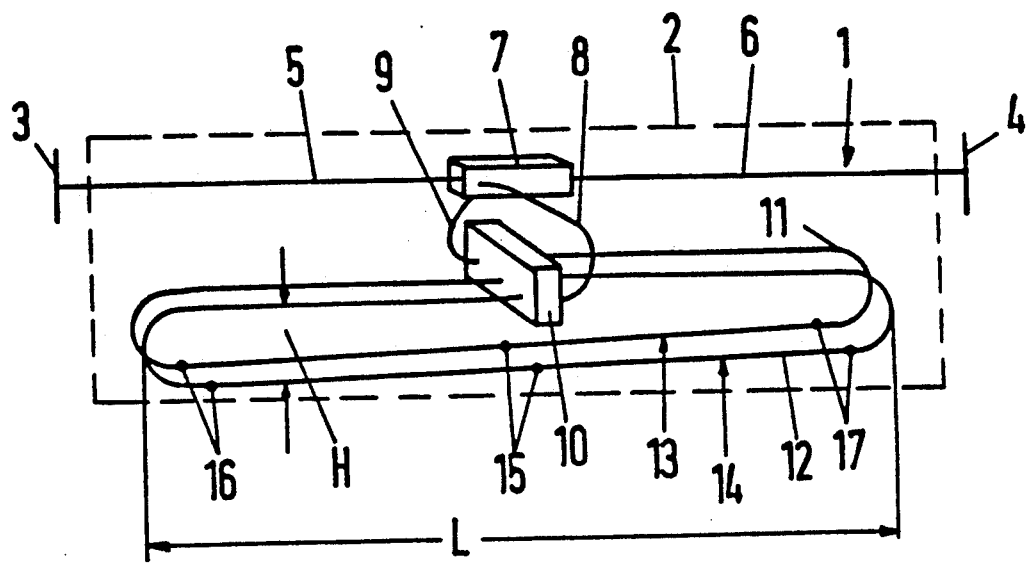

United States Patent [19]
Back-Pedersen et al.

[11] Patent Number: 5,020,375
[45] Date of Patent: Jun. 4, 1991

[54] FLOW METER WORKING ON THE CORIOLIS PRINCIPLE (II)

[75] Inventors: Andreas Back-Pedersen, Valby; Ole B. Nielsen, Sonderborg; Hans C. Moller, Augustenborg, all of Denmark

[73] Assignee: Danfoss A/S, Nordborg, Denmark

[21] Appl. No.: 377,328

[22] Filed: Jul. 10, 1989

[30] Foreign Application Priority Data

Aug. 26, 1988 [DE] Fed. Rep. of Germany ....... 3829059

[51] Int. Cl.$^5$ ............................................. G01F 1/84
[52] U.S. Cl. ................................................. 73/861.38
[58] Field of Search ......................... 73/861.37, 861.38

[56] References Cited

U.S. PATENT DOCUMENTS

| | | | |
|---|---|---|---|
| 4,127,028 | 11/1978 | Cox et al. | 73/861.38 |
| 4,660,421 | 4/1987 | Dahlin et al. | 73/861.38 |
| 4,803,867 | 4/1989 | Dahlin | 73/861.38 |
| 4,825,705 | 5/1989 | Hohloch et al. | 73/861.38 |
| 4,852,409 | 8/1989 | Herzl | 73/861.38 |

FOREIGN PATENT DOCUMENTS 0239679 9/1988 Fed. Rep. of Germany.

Primary Examiner—Herbert Goldstein
Attorney, Agent, or Firm—Wayne B. Easton; Clayton R. Johnson

[57] ABSTRACT

In a flow meter that works on the Coriolis principle there is provided a single tube that is bent to have two measuring loops and a single tube section that connects the adjacent ends of the measuring loops. Tubular attachment end portions are respectively connected through resilient tubular portions to the opposite ends of the two loops and may be part of the single tube. Two blocks have tube holder portions for having the tubular section and the measuring loops opposite ends adjacent their juncture to the resilient portions and the attachment portions adjacent their juncture to the resilient portions respectively extended therethrough. The measuring loops are oscilatable in the opposite direction while sensors are provided adjacent to the measuring loops for measuring the relative movement of the loops relative to one another to provide a measurement of the fluid flow through the loops.

13 Claims, 7 Drawing Sheets

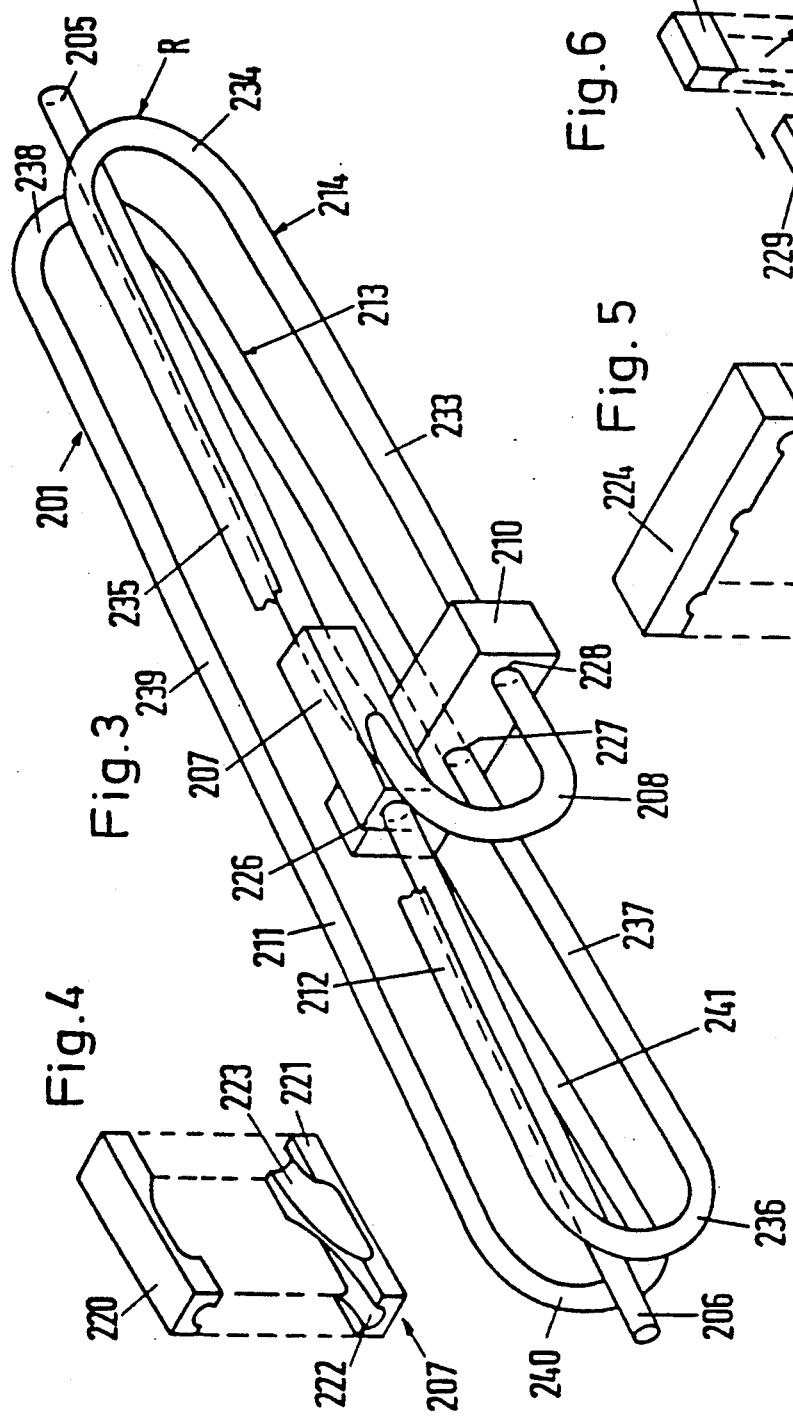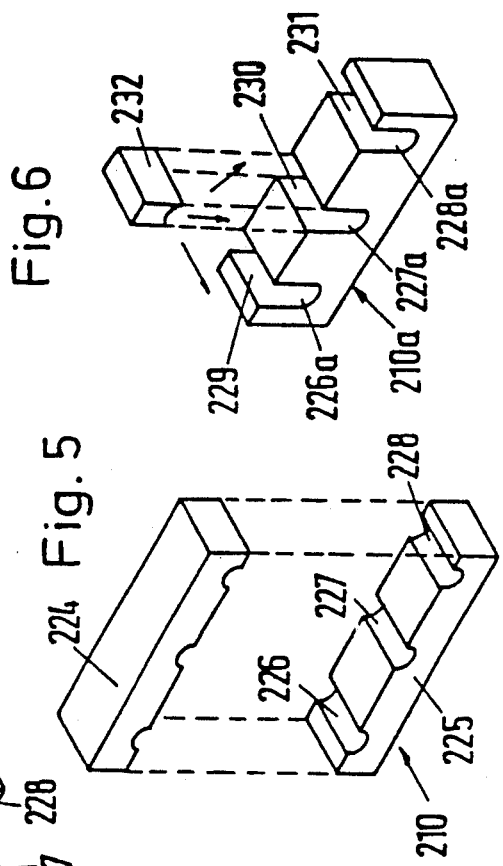

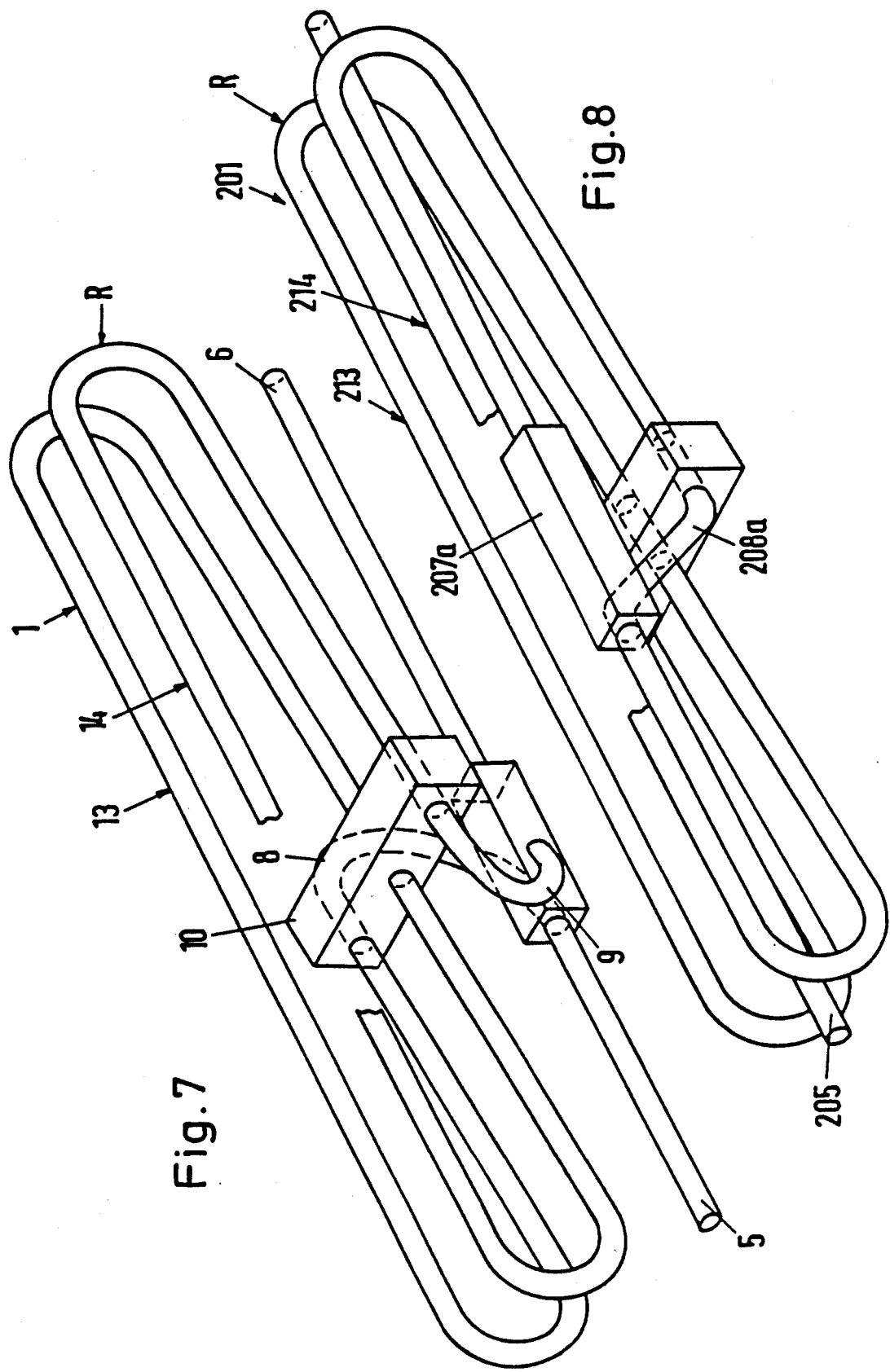

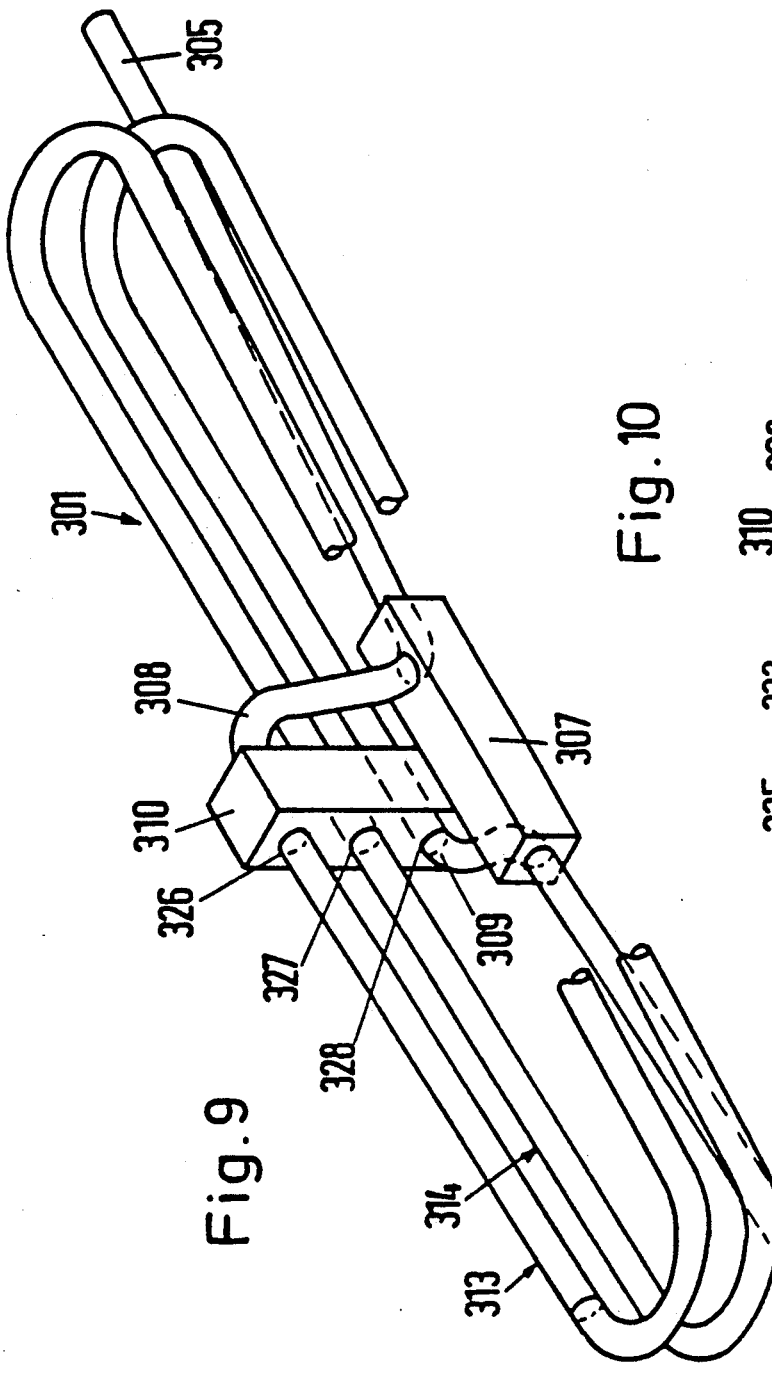
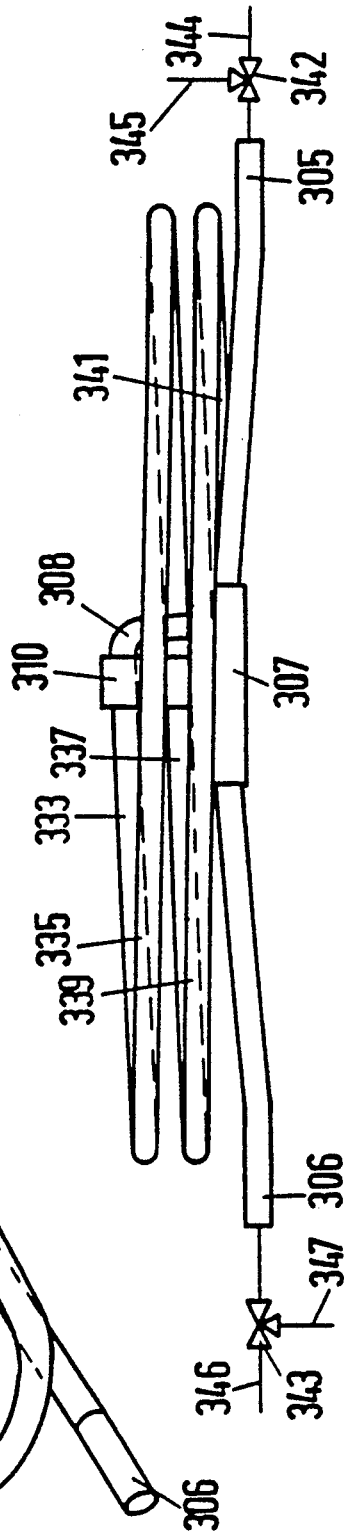

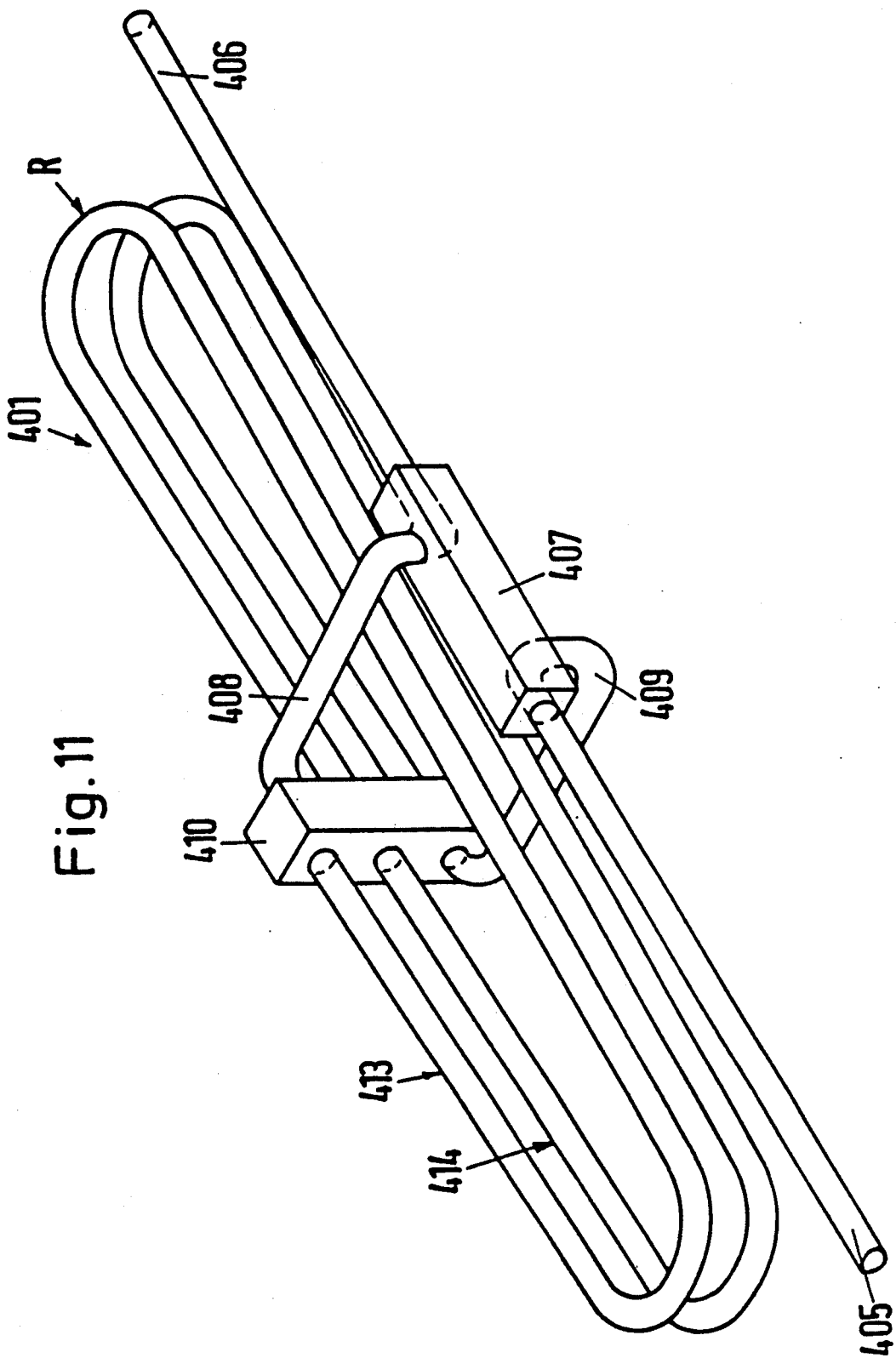

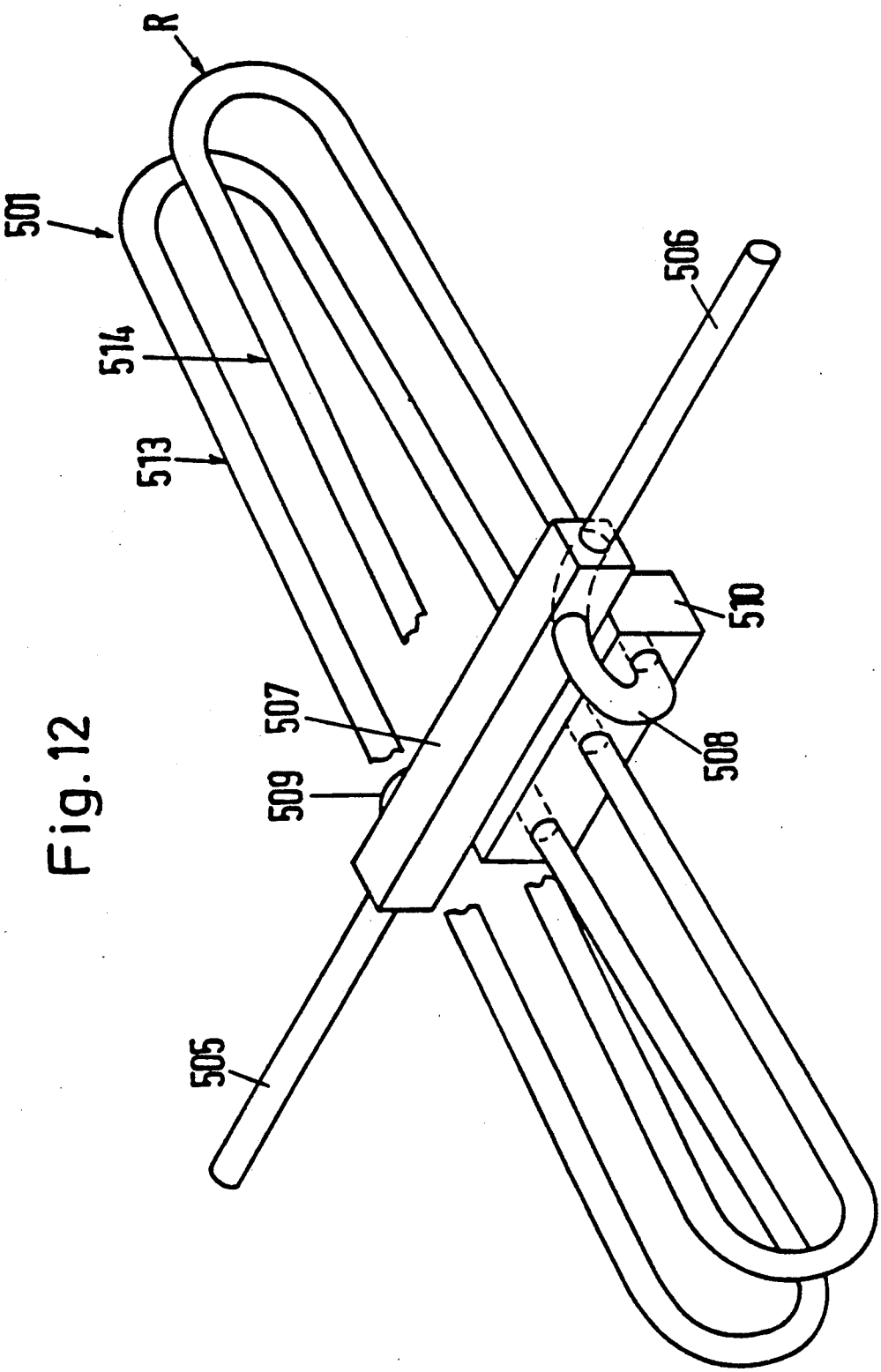

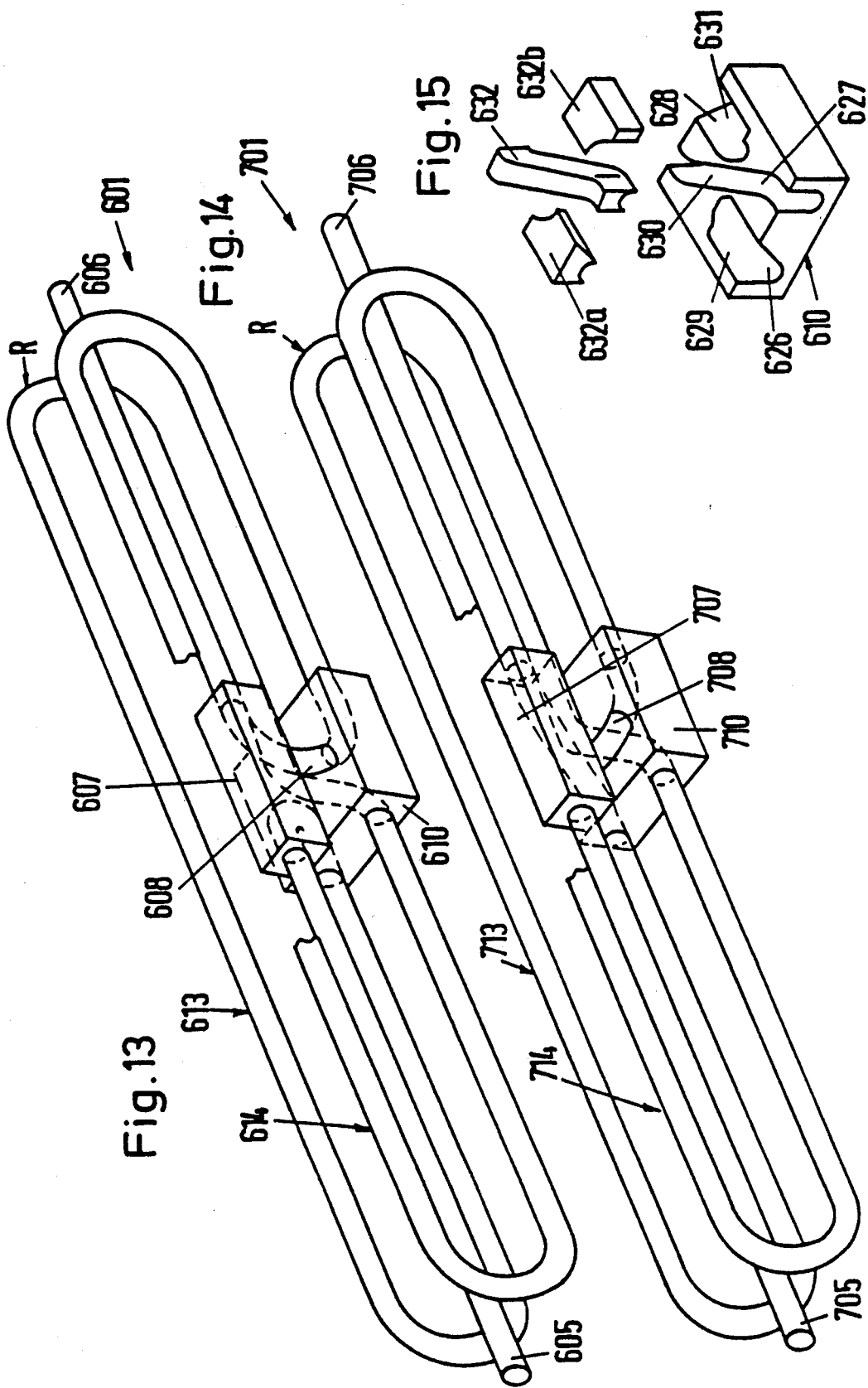

FLOW METER WORKING ON THE CORIOLIS PRINCIPLE (II)

The invention relates to a flow meter working on the Coriolis principle, comprising an attachment apparatus connected on one side to an upstream and a downstream final tube and on the other side to two juxtaposed measuring tube loops which can be oscillated in opposite directions by an oscillator and are provided with sensors for receiving a measurement depending on the relative movement.

In a known device of this kind (EP-OS No. 0 239 679 A1), a large solid block serves to interconnect the attachment tubes and the two measuring tube loops. For this purpose, three connecting orifices at the corners of a triangle are provided at each of two opposed ends. The ends of the attachment tubes and the measuring tube loops are fixed in these orifices. The connecting orifices for the attachment tubes and the two ends of each measuring tube loop are axially aligned. Within the block there are passages which interconnect the connecting orifices in such a way that the two measuring tube loops lie in series and are traversed in the same sense by the fluid to be measured. The production of such a flow meter is expensive because a multiplicity of tube sections has to be prefabricated and connected to the block.

It is the object of the invention to provide a flow meter of the aforementioned kind with a simpler construction and simpler to assemble.

This problem is solved according to the invention in that the two measuring tube loops are formed by a single tube bent several times and that the attachment apparatus has a tube holder for receiving a throughgoing single tube section connecting the two measuring tube loops.

The use of the single tube leads to considerable simplifications in production because the entire measuring loop arrangement is no longer put together from individual pieces but can be bent from a throughgoing tube which need then only be joined to the tube holders. At the transition from the one measuring tube to the other, the flow section remains constant. Nor is it unfavourably influenced by solder points and the like and it presents no sealing problems. No pocket is formed in which dirt can collect. There is no fear of reactions between the medium to be measured and the solder material. One can expect a uniform strength of the tube throughout.

The aforementioned advantages apply to the entire measuring device if the attachment tubes are likewise formed by the single tube and the attachment apparatus comprises tube holders for receiving two throughgoing single tube sections adjoining the connecting tubes. In this construction, only a single tube is employed in the entire measuring device and it is fixed at particular points by the tube holders. A constant throughflow cross-section is available everywhere. Nowhere need one fear pockets, interfering solder points and the like. The meter is "hygienically created" and retains this property. Since no solder points or the like are provided along the entire length of measuring loop, there is also no danger of overstressing such points during oscillation of the loops.

In a preferred embodiment, the attachment apparatus comprises a first block connected to the attachment tubes and at least one pair of resilient connecting tubes between the two blocks, the connecting tubes are also formed by the single tube, and both blocks each comprise two tube holders for receiving throughgoing single tube sections which adjoin the connecting tubes. The resilient connecting tubes can be taken into account without difficulty during bending of the individual tube. They ensure that the second block remains substantially free from external influences such as clamping forces and clamping torques, vibrations and the like. Consequently, the use of a very strong block of large mass that was hitherto conventional can be dispensed with. Upon a change in temperature of the medium, the small blocks rapidly adapt to the changed temperature. All this increases the measuring accuracy.

In the simplest case, the tube holders are divided for inserting the tube sections. After insertion, the two parts need merely be placed on each other and connected, which can be effected by adhesion, soldering, welding, screws or a simple frictional connection.

The attachment apparatus may comprise at least one divided block of which the parting gap passes through at least two tube holders. Such blocks are easy to assemble and manipulate.

Alternatively, the blocks may be cast or extruded around the appropriate tube sections.

The use of the throughgoing single tube also permits a block for receiving the measuring tube ends to have tube holders of an extremely short axial length. In particular, the length can be less than the largest width of the block. This short length keeps the thermal expansion in the direction of the tube extremely low during temperature changes. The measuring tube loops are therefore at most subjected to thermal stresses to a negligible extent. This likewise increases the measuring accuracy.

In a preferred embodiment, the axial length of the tube holders is less than 10%, preferably less than 5%, of the largest measurement of the measuring loops measured in the same direction.

It is particularly advisable for the single tube to consist predominantly of straight tube sections which are interconnected by way of four 180° bends to form the two measuring tube loops and by way of further bends to extend them to the connecting tubes. This simplifies production because one can make do with a total of six bends.

Preferably, the straight tube sections are substantially parallel. This results in an elongate meter requiring a small cross-section in a plane perpendicular to the tube sections and therefore capable of being accommodated, for example in a protective tube.

It is in this case recommended that the tube holders for the ends of the measuring tubes be juxtaposed and receive parallel tube sections. This very simple construction leads to the measuring tube loops being slightly spirally deformed. However, since this deformation takes place equally in both measuring tube loops, it does not detrimentally affect measurement.

It is also advantageous for the length of the measuring tube loops measured in the direction of the straight tube sections to have a ratio L/H larger than 6, preferably about 10, to the height prescribed by the 180° bends. This dimensioning leads to a meter which not only has a small total cross-section but also possesses a high measuring sensitivity and mechanical strength. This is because a substantial part of the oscillation movement is received by torsion on the measuring tubes and this gives less mechanical stress than corresponding bending.

Figure 2:
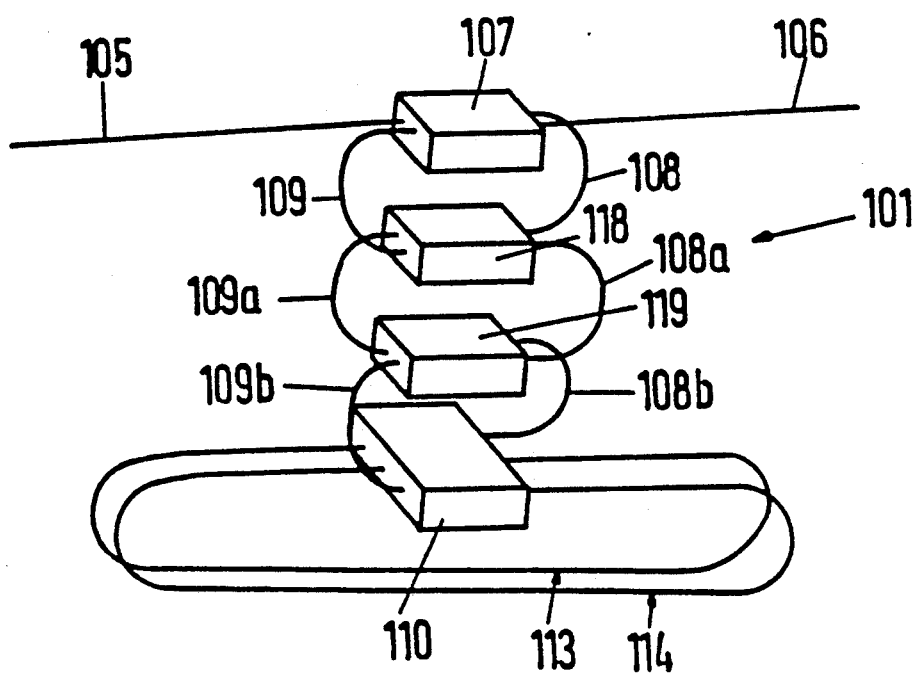

Preferred examples of the invention will now be described in more detail with reference to the drawing, wherein:

FIG. 1 is a diagrammatic representation of a flow meter according to the invention, FIG. 2 is the diagrammatic representation of a modified embodiment, FIG. 3 is a perspective view of one constructional solution, FIG. 4 shows a first block, FIG. 5 shows a second block, FIG. 6 shows a modification of the second block, FIG. 7 is a perspective view of a second constructional solution, FIG. 8 is a perspective view of a third constructional solution, FIG. 9 is a perspective view of a fourth constructional solution, FIG. 10 is a side elevation of the FIG. 9 construction, FIG. 11 is a perspective view of a fifth constructional solution, FIG. 12 is a perspective view of a sixth constructional solution, FIG. 13 is a perspective view of a seventh constructional solution, FIG. 14 is a perspective view of an eight constructional solution, and FIG. 15 shows a further alternative for the second block.

FIG. 1 illustrates a flow meter 1 which works on the Coriolis principle and can be accommodated in a protective tube 2. Only the two flanges 3 and 4 project outwardly for connection to a tube system. The flanges are connected to an upstream attachment conduit 5 and a downstream attachment conduit 6, respectively. The confronting ends are received by a first block 7. The latter is connected to a second block 10 by way of two resilient connecting tubes 8 and 9 which are each in series with one attachment tube 5 or 6. The second block carries two measuring tube loops 13 and 14, each formed by one measuring tube 11, 12. The loops extend to both sides of the second block 10 by substantially the same length, are connected in series and are connected at their ends to a respective connecting tube 8, 9. In the middle of the measuring tube loops, there are parts of a diagrammatically indicated oscillator 15 which oscillates the measuring tube loops 13 and 14 in opposite senses. Sensors 16 and 17 which are likewise only diagrammatically indicated provide a measurement depending on the relative motion of the tubes, for example a stress which is proportional to the relative speed.

The resilient connecting tubes 8 and 9 ensure that the second block 10 and the measuring tube loops 13 and 14 carried thereby are substantially free from external influences such as clamping forces and torques, vibrations and the like.

Since the measuring tube loops 13 and 14 consisting of straight and semi-circularly bent tube sections have a long length L relatively to the height H, the measuring tubes are to a lesser extend loaded in bending and to an increased extent by torsion, which reduces stressing of the material. In addition, one obtains a high sensitivity during measurement of the amount flowing through.

In the illustrated example, the measuring tube loops have a length L of 34 cm and a height H of 6 cm. In an alterative construction, L=37 cm and H=4 cm. If necessary, the measurements can also be larger. As may be seen from, for example, FIG. 1, the maximum axial dimension of the first block is many times less than the axial length L of the a measuring loop.

The blocks 7 and 10 can be light in weight so that their temperature rapidly follows any temperature changes in the medium. In the direction of the length L of the measuring tube loop, the block 10 can be kept short so that temperature elongation in this direction is small and no thermal stresses are exerted on the measuring tube loops 13 and 14. This gives a high measuring accuracy and temperature stability.

In the FIG. 2 embodiment, corresponding parts are given reference numerals increased by 100. Between the first block 107 and the second block 110 there are two further blocks 118 and 119. Consequently, resilient connecting tubes 108 and 109 extend between the first block 107 and the further block 118, resilient connecting tubes 108a and 109a between the two further blocks 118 and 119, and resilient connecting tubes 108b and 109b between the further block 119 and the second block 110. The following tube circuit is obtained: Attachment tube 105 - connecting tube 108 - connecting tube - 109a - connecting tube 108b - measuring tube loop 113 - measuring tube loop 114 -connecting tube 109b - connecting tube 108a - connecting tube 109 -attachment tube 106.

In this construction, the external influences are still better avoided by the second block 110 and the measuring tube loops 113 and 114.

In all the following embodiments, the attachment tubes, connecting tubes and measuring tubes consist of a single tube R built several times. In the representations, the oscillators and sensors have been omitted for the sake of simplicity. They are located in substantially that position of the measuring tube loops as shown in FIG. 1. Depending on the type of sensor, different arrangements are also possible.

In the embodiment of FIGS. 3 to 5, corresponding parts have reference numerals increased by 200 relatively to FIG. 1. The first block 207 consist of an upper portion 220 and a lower portion 221 which, in the assembled condition, form two tube holders 222 and 223. The tube holders each extend from one end face to one side face of the block 207.

The second block 210 likewise consist of an upper portion 224 and a lower portion 225 which together form three tube holders 226, 227 and 228 in the form of parallel apertures. In the alternative of FIG. 6, the block 210a is provided with grooves 229, 230 and 231 closable by a respective insert 232 to leave tube holders 226a, 227a and 228a in the form of parallel apertures.

The single tube R is bent several times and placed at predetermined positions in the tube holders 222, 223, 226, 227 and 228 which are closed by bringing the upper portion and lower portion together. The upper and lower portions are then interconnected and connected to the appropriate tube sections by the first and second blocks respectively, the nature of the connection depending on the materials. The tube can be of steel, brass or the like. The blocks can be of steel, brass or some other metal. The connection is desirably by soldering or welding. However, adhesion or simple clamping are also possible.

The end effect is a structure in which the attachment tubes 205 and 206 enter the first block 207 at opposite ends and the connecting tubes, such as the tube 208, leave at opposite side faces of this block 207. The connecting tubes have a deflecting bend with which they merge with a straight tube section 233 which is received by the tube holder 228 and forms the end section of the measuring tube 212. There follows a semicircular bend 234 which is connected to a straight tube section 235 extending over the entire length of the measuring tube loop 214. There follows a semicircular bend 236 which again adjoins a straight tube section 237 which extends over practically the entire length, is held at the middle in the tube holder 227, forms part of the measuring tube loop 213 at one side and part of the measuring tube loop 214 on the other side. There again follows a semi-circular bend 238, a straight section 239, a semicircular bend 240 and a straight section 241 which is held in the tube holder 226 and merges with a connecting tube corresponding to the connecting tube 208. The two measuring tube loops 213, 214 are therefore suspended at the middle of their axial length by a comparatively narrow block 210. If one regards each measuring tube loop as a formation put together from two hair clips, the limbs of each hair clip are practically of equal length.

A single tube R thus formed can be readily produced from a straight tube because it is only necessary to produce the semi-circular bends 234, 236, 238 and 240 and the bends located in the vicinity of the connecting tubes 208. Since the straight tube sections 233, 237 and 241 are inserted in the parallel tube holders 226, 227 and 228, the measuring tube loops 213 and 214 are slightly spiral. However, their associated tube sections are parallel to each other. Since we are merely concerned with the fixing of the tubes, the tube holders need not be long. In particular, in the case of the second block 210, the tube holder length can be selected to be so short that temperature elongations in the direction of the tube play practically no role. These tube holders have a length of only a few cm. It is desired to keep this length as short as possible, for example 2 cm.

As shown in FIG. 3, the first block 207 lies between the two measuring tube loops 213 and 214. The two attachment tubes 205 and 206 are disposed between the two measuring tube loops. This gives an extraordinarily compact construction of which the entire height is only slightly more than the height H of the measuring tube loops.

The FIG. 7 embodiment corresponds to FIG. 1, the meter merely being inverted. The same reference numerals as in FIG. 1 are therefore employed.

The FIG. 8 embodiment corresponds to that of FIG. 3. The same reference numerals are therefore employed. The only difference is that the connecting tube 208a is connected to the upstream attachment tube 205 and leaves at the underside of the first block 207a. The same applies to the other connecting tube. This enables comparatively short and therefore stiff resilient connections to be achieved.

In the embodiment of FIGS. 9 and 10, reference numerals are employed which are increased by 300 relatively to FIG. 1. In this case, the two measuring tube loops 313 and 314 are superposed because the tube holders 326, 327 and 328 likewise lie in a vertical plane. By reason of the spiral shape, the straight tube sections 333, 335, 337, 339 and 341 have a continuous inclination towards the downstream attachment conduit 306. This meter is arranged between a 3-way change-over valve 342 and 3-way change-over valve 343. The change-over valve 342 selectively connects the attachment tube 305 to a conduit 344 conveying the medium to be measured or to atmosphere 345. The change-over valve 343 selectively connects the attachment tube 306 to the conduit 346 for the medium to be measured or to a discharge 347. Now, if in the case of the valve 342 the path to atmosphere 345 and for the valve 343 the path to the discharge 347 are opened, the entire system can empty itself automatically. If, subsequently, a different medium of which the throughflow is to be measured is carried by the conduits 344 and 346, there will be no mixing with residues of the preceding medium. In this construction, the first block 307 is located in the projection of the measuring tube loops 313 and 314.

FIG. 11 illustrates an embodiment with reference numerals increased by 400. Again, the second block 410 is vertical. The first block 407 lies beyond the vertical projection of the measuring tube loops 413 and 414. It is disposed at half the height of the second block 410 so that substantially straight connecting tube sections can be employed.

In the FIG. 12 embodiment, where reference numerals increased by 500 are employed, the peculiarity is that the longitudinal extent of the first block 507 is parallel to the longitudinal extent of the second block 510. In this way, the axis of the attachment tubes 505 and 506 can be disposed perpendicular to the planes of the measuring tube loops 513 and 514.

In the FIG. 13 embodiment, reference numerals increased by 600 are employed. Here, the measuring tubes are again applied to opposite ends of the second block 610. On the other hand, the connecting tubes 608 leave from the upper side face of this block. In this way, the measuring tube loops 613 and 614 can be accommodated in two parallel planes. The connecting tubes 608 give a 180° deflection.

As shown in FIG. 14 with reference numerals increased by 700, the parallel arrangement of the measuring tube loops 713 and 714 can also be realised in that the connecting tubes 708 do not provide a 180° deflection.

As may be clearly seen from, for example, FIGS. 1, 11, and 12, the adjacent ends of a first and a second attachment tube are respectively fluidly connected to the first ends of the first and second connecting tubes and interconnected by the first block while adjacent to the juncture of the first connecting tube to the first end portion of the first loop, the juncture of the loops opposite end portions and the juncture of the first end of the second loop and the second end of the second connecting tube, there is an interconnection provided by a second block that is joined thereto.

In these cases, however, a somewhat differently formed second block has to be used, as is shown for the block 610 in FIG. 15. It contains three grooves 629, 630 and 631 which are covered by corresponding fillers 632, 632a and 632b to leave tube holders 626, 627 and 628. These tube holders are adapted to the shape of the bent tube sections.

For further particulars, attention is drawn to the applicants' applications similarly entitled "Flow meter working on the Coriolis principle" (I), (III) and (IV).

The resilient connecting tubes can also be employed in conjunction with measuring tube loops shaped differently from those illustrated in the drawings, for example circular loops.

We claim:

1. A flow meter working on the Coriolis principle for measuring fluid flow, comprising a tubular upstream attachment end portion, a tubular downstream attachment end portion, the attachment end portions having adjacent ends, a tube formed from a single piece and having a first measuring loop that has a first end and an opposite end, a second measuring loop having a first end and an opposite end joined to the first loop opposite end, first tubular means for joining the upstream end portion to the first loop first end, and second tubular means for joining the second loop first end to the downstream end portion, each of the tubular means having a first end remote from the respective attachment portion to which it is joined that is joined to the first end of the respective loop, the measuring loops having several bends and being juxtaposed, oscillator means adjacent to the loops for oscillating the loops in the opposite sense relative to one another, sensors means adjacent to the loops for providing a measurement that depends on motion of the measuring loops that are being oscillated, a first tube holder block having the tube extended thereinto and joined to the tube adjacent to the juncture of the first and second loop opposite ends, the juncture of the first tubular means to the first loop first end, and the juncture of the second tubular means to the second loop first end for retaining each of the loop first ends in spaced relationship to one another and to the opposite ends of the loops, and a second tube holder block for interconnecting the attachment portions adjacent to the juncture of the attachment means to the tubular means, and having the attachment portions ends extending thereinto, the first block being separate and spaced from the second block and being carried by the tubular means.

2. A flow meter according to claim 1, characterized in that each of the tubular means comprises a resilient connecting tube portion that constitutes parts of the single tube for reducing forces acting on the second block being transmitted to the first block, each block having means defining two tube holder portions for respectively having the attachment end portions extended thereinto and the measuring loop first ends extended thereinto.

3. A flow meter according to claim 1, characterized in that each of the attachment end portions is predominantly a straight tube section, that the single tube is predominantly composed of straight line sections that form parts of the measuring loops, the single tube including four 180 degree bends interconnecting the single tube straight line portions and forming parts of the measuring loops and that each of the tubular means are arcuately bent.

4. A flow meter according to claim 3, characterized in that each of the straight tube sections is substantially parallel to other straight tube sections.

5. A flow meter according to claim 4, characterized in that the second block includes means for defining a first tube holder having the first and second loop first ends extended thereinto and second and third tube holders that are parallel to the first tube holder and juxtaposed to the first and second loops first ends respectively for having the first and second loops first ends extended thereinto.

6. A flow meter according to claim 5, characterized in that the straight tube sections are axially elongated, that the measuring loops are of a length (L) measured in the direction of elongation of the straight tube sections, that the 180 degree bends have a height (H), and that the ratio of L/H is larger that 6.

7. A flow meter according to claim 6, characterized in that the ratio of L/H is preferably about 10.

8. A flow meter according to claim 1, wherein there is provided a protective tube that accommodates the blocks and the loops therein.

9. A flow meter according to claim 1, characterized in that the first block has a first, a second and a third tube holder having the tube extended thereinto, the second tube holder being intermediate the first and third tube holders and having the first and second loop opposite ends extended thereinto.

10. A flow meter according to claim 9, characterized in that the measuring loops are axially elongated, and that the axial length of the tube holders that is taken in the same direction as the elongation of the measuring loops is less than 10% of the maximum dimension of the measuring loops.

11. A flow meter according to claim 10, characterized in that the axial length of the tube holders is less than 5% of the maximum axial dimension of the measuring loops and that the dimension of the first block in the same direction as the direction of elongation of the measuring loops is less than 10% of the maximum axial dimension of the measuring loops.

12. A flow meter according to claim 1, characterized in that the loops are axially elongated, have intermediate portions along the length of the tube intermediate the junctures of the loops first ends and opposite ends of the loops to the first block, and have axial portions along the tube that extend along the tube toward the intermediate portions and away from first block in opposite axial directions from the first block and that the oscillator is located adjacent to the intermediate portions.

13. A flow meter according to claim 10, characterized in that the axial dimension of the second block is many times less than the dimension of one of the measuring loops.

* * * * *